(12) United States Patent
Zhang et al.

(10) Patent No.: US 10,284,949 B2
(45) Date of Patent: May 7, 2019

(54) IMPEDANCE MATCHING METHOD AND APPARATUS FOR ELECTRET MICROPHONE, AND COMMUNICATION DEVICE

(71) Applicant: ZTE CORPORATION, Shenzhen, Guangdong (CN)

(72) Inventors: Feng Zhang, Guangdong (CN); Wei Wang, Guangdong (CN)

(73) Assignee: ZTE Corporation, Guangdong (CN)

( * ) Notice: Subject to any disclaimer, the term of this patent is extended or adjusted under 35 U.S.C. 154(b) by 13 days.

(21) Appl. No.: 15/625,281

(22) Filed: Jun. 16, 2017

(65) Prior Publication Data
US 2017/0289680 A1    Oct. 5, 2017

Related U.S. Application Data

(63) Continuation of application No. PCT/CN2015/091565, filed on Oct. 9, 2015.

(30) Foreign Application Priority Data

Dec. 16, 2014  (CN) .......................... 2014 1 0784111

(51) Int. Cl.
*H04R 3/00*   (2006.01)
*G01H 11/06*   (2006.01)
(Continued)

(52) U.S. Cl.
CPC ............. *H04R 3/007* (2013.01); *G01H 11/06* (2013.01); *H04R 19/016* (2013.01); *H04R 19/04* (2013.01);
(Continued)

(58) Field of Classification Search
USPC ...... 381/26, 56, 58, 59, 61, 91, 92, 111, 121
See application file for complete search history.

(56) References Cited

U.S. PATENT DOCUMENTS 5,357,214 A * 10/1994 Heyl ..................... H03F 3/183
                                                    330/297
6,233,440 B1 * 5/2001 Taylor .................. H03F 1/0261
                                                    330/296
(Continued)

FOREIGN PATENT DOCUMENTS

| CN | 102932712 A | 2/2013 |
| CN | 202889621 U | 4/2013 |
| CN | 203942638 U | 11/2014 |

OTHER PUBLICATIONS

International Search Report dated Jan. 20, 2016 for International Application No. PCT/CN2015/091565, 4 pages.

*Primary Examiner* — Yosef K Laekemariam
(74) *Attorney, Agent, or Firm* — Knobbe, Martens, Olson & Bear, LLP

(57) ABSTRACT

An impedance matching method for an electret microphone is provided. In some embodiments, the impedance matching method includes collecting a bias voltage between a source and a drain of a field effect transistor built in the electret microphone; determining whether the bias voltage is within a preset bias voltage threshold range; and if it is detected that the bias voltage is not within the preset bias voltage threshold range, sending a corresponding control signal to adjust load bias impedance so that the bias voltage is within the preset voltage threshold. An impedance matching apparatus for an electret microphone and a communication device are also provided.

15 Claims, 4 Drawing Sheets

(51) Int. Cl.
*H04R 19/01* (2006.01)
*H04R 19/04* (2006.01)
*H04R 29/00* (2006.01)
*H04R 3/06* (2006.01)

(52) U.S. Cl.
CPC ............ *H04R 29/004* (2013.01); *H04R 3/06* (2013.01); *H04R 2499/11* (2013.01)

(56) References Cited

U.S. PATENT DOCUMENTS

| | | |
|---|---|---|
| 8,611,132 B2 | 12/2013 | Jung et al. |
| 8,687,302 B2 | 4/2014 | Hoque et al. |
| 2012/0275212 A1 | 11/2012 | Jung et al. |
| 2013/0195291 A1* | 8/2013 | Josefsson ................ H02M 1/12 381/174 |
| 2013/0201578 A1 | 8/2013 | Hoque et al. |

* cited by examiner

IMPEDANCE MATCHING METHOD AND APPARATUS FOR ELECTRET MICROPHONE, AND COMMUNICATION DEVICE

CROSS REFERENCE TO RELATED APPLICATIONS

This application claims priority to International Application No. PCT/CN2015/091565, filed on Oct. 9, 2015, which claims priority to Chinese Patent Application No. CN201410784111.6, filed on Dec. 16, 2014, each of which is incorporated by reference in its entirety.

TECHNICAL FIELD

The present disclosure relates to the field of impedance matching for an electret microphone (MIC), and particularly to an impedance matching method and apparatus for an electret microphone, as well as a communication device.

BACKGROUND

An electret microphone is widely applied to devices such as a mobile phone and a recording pen due to the advantages of small volume, simple structure, wide frequency response, high sensitivity, vibration resistance and low price. Particularly, the electret microphone is popularized in a high-end recording device. An operating principle of the electret microphone is as follows: when an electret diaphragm vibrates due to an acoustic wave, a change in a distance between the electret diaphragm and a metal polar plate may be caused. That is, a capacitance of a capacitor formed between the electret vibrating diaphragm and the metal polar plate changes with the acoustic wave, causing a change in an inherent electric field across the capacitor, thereby generating an alternating voltage changing with the change in the acoustic wave. Since the "capacitor" formed between the electret diaphragm and the metal polar plate has relatively small capacitance, the output impedance thereof is high, which is about tens of megohms or more. Such high impedance fails to directly match an input end of a general audio amplifier, so that a field effect transistor is provided in the MIC for performing impedance conversion. An internal circuit of the electret microphone is shown in FIG. 1. A voltage across the "capacitor" is extracted by the field effect transistor with very high input impedance, and is amplified, so that an output voltage signal corresponding to the acoustic wave is obtained.

The performance of the electret MIC is largely dependent on an operating state of the field effect transistor built in. Therefore, the state of the field effect transistor in the circuit not only determines whether the microphone can work normally, but also determines the operating performance of the microphone. However, the state of the field effect transistor in the circuit depends on amplitudes of a bias resistor RL and a supply voltage U. The bias resistor and the supply voltage are arranged to provide a direct current bias to the field effect transistor amplifier, so as to ensure that the field effect transistor operates in a constant current region (a linear active region). If an operating bias voltage $U_{Ds}$ of the MIC is too high or too low, cut-off distortion or saturation distortion will occur with respect to a large input signal. However, characteristics of the field effect transistor in the MICs of different batches and different manufacturers are different, so that the operating bias voltages $U_{Ds}$ of the MICs are different as well, while the operating bias voltages of the MICs will affect the quality of voice signals output by the MICs. Therefore, it is an urgent problem to be solved to keep the bias voltage $U_{Ds}$ of the field effect transistor built in, or disposed in, the electret microphone within a certain voltage range.

SUMMARY

An impedance matching method for an electret microphone includes the following steps:
collecting a bias voltage between a source and a drain of a field effect transistor built in the electret microphone;
determining whether the bias voltage is within a preset bias voltage threshold range; and
adjusting load bias impedance so that the bias voltage is within the preset bias voltage threshold range, if it is determined that the bias voltage is not within the preset bias voltage threshold range.

An impedance matching apparatus for an electret microphone includes a processor and a storage device for storing computer executable instructions that when executed by the processor cause the processor to perform the steps in following modules:
a collection module, arranged to collect or measure a bias voltage output by the electret microphone;
a determination module, arranged to determine whether the bias voltage is within a preset bias voltage threshold range; and
a control module, arranged to adjust load bias impedance so that the bias voltage is within the preset bias voltage threshold range, if it is determined by the determination module that the bias voltage is not within the preset bias voltage threshold range,
the load bias impedance is and/or can include a resistance of a bias resistor connected between a drain of a field effect transistor built in the electret microphone and a supply voltage of the electret microphone A communication device includes any one of the above impedance matching apparatus for the electret microphones.

A non-transitory computer storage medium stores computer-executable instructions, wherein the computer-executable instructions are used for executing an impedance matching method for an electret microphone, including: collecting a bias voltage between a source and a drain of a field effect transistor built in the electret microphone; determining whether the bias voltage is within a preset bias voltage threshold range; and adjusting load bias impedance so that the bias voltage is within the preset bias voltage threshold range, if it is determined that the bias voltage is not within the preset bias voltage threshold range; wherein the load bias impedance is a resistance of a bias resistor connected between the drain of the field effect transistor and a supply voltage of the electret microphone.

DETAILED DESCRIPTION

The following is an overview of the subject matter that is described herein in detail. This overview is not intended to limit a protective scope of the claims.

It is to be understood that specific embodiments described herein are merely illustrative of the present disclosure and are not intended to limit the present disclosure.

Figure 2:
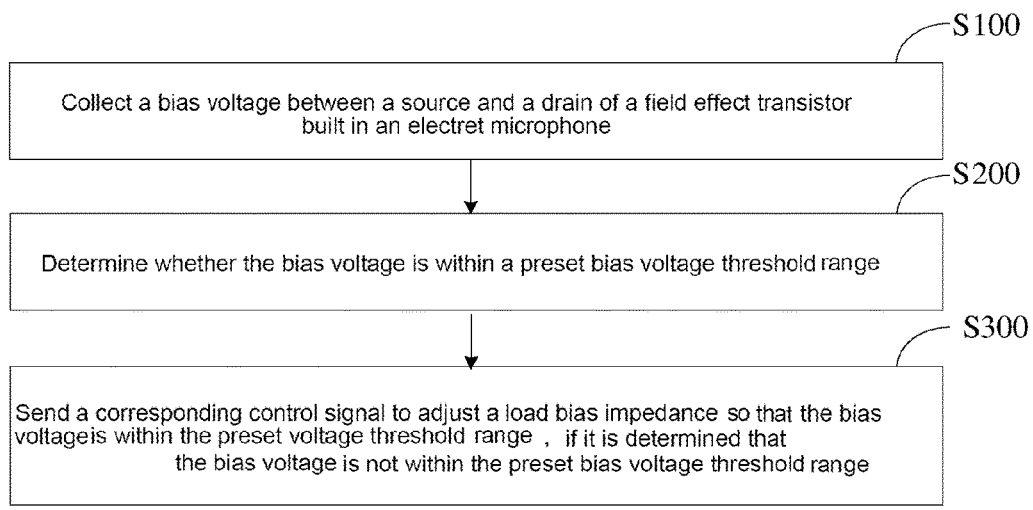
FIG. 2 is a schematic flow diagram showing a first embodiment of an impedance matching method for an electret microphone.

An embodiment provides an impedance matching method for an electret microphone. With reference to FIG. 2, FIG. 2 is a schematic flow diagram showing a first embodiment of an impedance matching method for an electret microphone. In the first embodiment, the impedance matching method for the electret microphone provided by the embodiment includes steps described below.

In step S100, a bias voltage $U_{Ds}$ between a source and a drain of a field effect transistor built in an electret microphone is collected.

Figure 1:
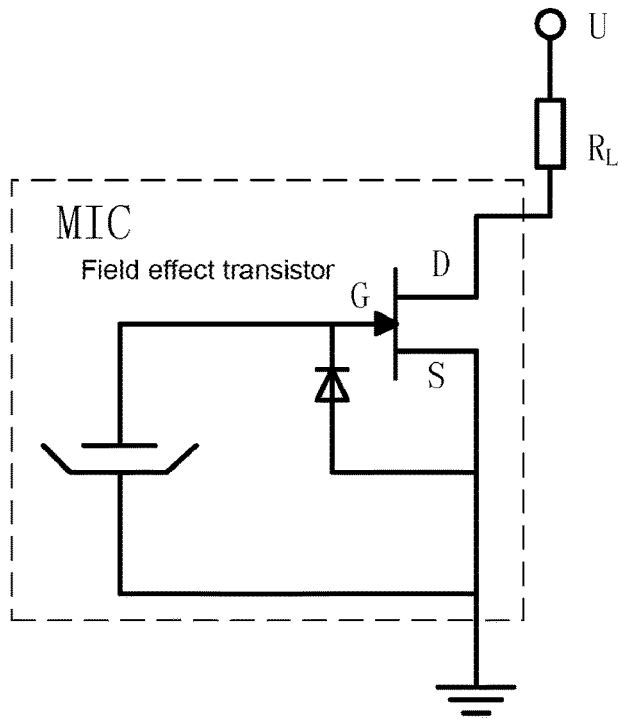
FIG. 1 is a schematic diagram showing an internal circuit of an electret microphone in the related art.

The electret microphone may include an "acoustic-electric" transition portion and an impedance conversion portion. A key element of the "acoustic-electric" transition portion may be an electret vibrating diaphragm which adopts a very thin plastic film as a substrate. A pure metal film layer is evaporated on a side surface of the substrate, and then the substrate is subjected to an "electret" treatment through a high-voltage electric field, so that opposite charges that may be preserved for a long time are formed on two side surfaces of the substrate. The impedance conversion is realized by means of the field effect transistor built in. The metal polar plate of the electret microphone is connected with a gate G of the field effect transistor, and a source S and a drain D of the field effect transistor are served as extraction electrodes of the electret microphone. Accordingly, together with a metal housing, the electret microphone includes a total of three extraction electrodes, an internal circuit of which is shown in FIG. 1. If the source S (or drain D) of the field effect transistor is connected with the metal housing, only two extraction electrodes are left in the microphone.

An operating principle of the electret MIC may be as follows: when the electret diaphragm vibrates due to an acoustic wave, a change in a distance between the electret diaphragm and the metal polar plate may be caused. That is, a capacitance of a capacitor formed between the electret vibrating diaphragm and the metal polar plate changes with the acoustic wave, causing a change in an inherent electric field across the capacitor (U=Q/C), thereby generating an alternating voltage changing with the change in the acoustic wave. Since the "capacitor" formed between the electret diaphragm and the metal polar plate includes relatively small capacitance (generally, tens of picofarads), the output impedance thereof is high (XC=½πfC), which is about tens of megohms or more. Such high impedance fails to directly match an input end of a general audio amplifier, so that a junction field effect transistor is provided in the MIC for performing impedance conversion. The voltage across the "capacitor" is extracted by the field effect transistor with very high input impedance, and is amplified, so that an output voltage signal corresponding to the acoustic wave is obtained.

An impedance matching apparatus for the electret microphone is arranged to first collect the bias voltage $U_{Ds}$ between the source and the drain of the field transistor built in the electret microphone.

In step S200, it is determined whether the bias voltage is within a preset bias voltage threshold range.

The impedance matching apparatus for the electret microphone is arranged to determine whether the collected bias voltage $U_{Ds}$ is within the preset bias voltage threshold range. The bias voltage threshold range may be preset by a user, or the bias voltage threshold range may be adjusted properly according to characteristics of the field transistor built in by the user in the actual detection. An upper limit of the bias voltage threshold range is preset as a value obtained by adding one half of the supply voltage of the electret microphone with an offset value, and a lower limit of the bias voltage threshold range is preset as a value obtained by subtracting the offset value from one half of the supply voltage of the electret microphone.

In step S300, if it is determined that the bias voltage is not within the preset bias voltage threshold range, a corresponding control signal is sent to adjust load bias impedance so that the bias voltage is within the preset bias voltage threshold range.

If it is detected by the impedance matching apparatus for the electret microphone that the bias voltage is not within the preset bias voltage threshold range, the corresponding control signal is sent to adjust the load bias impedance so that the bias voltage is within the preset bias voltage threshold range. For example, if it is detected that the bias voltage is greater than the upper limit of the preset bias voltage threshold range, the load bias impedance is increased; if it is detected that the bias voltage is less than the lower limit of the preset bias voltage threshold range, the load bias impedance is decreased; if it is detected that the bias voltage is within the preset bias voltage threshold range, the load bias impedance is kept constant.

The impedance matching method for the electret microphone provided by the present embodiment improves the quality of a voice signal output by the MIC, and improves the recording quality and the call quality of a communication device.

Figure 3:
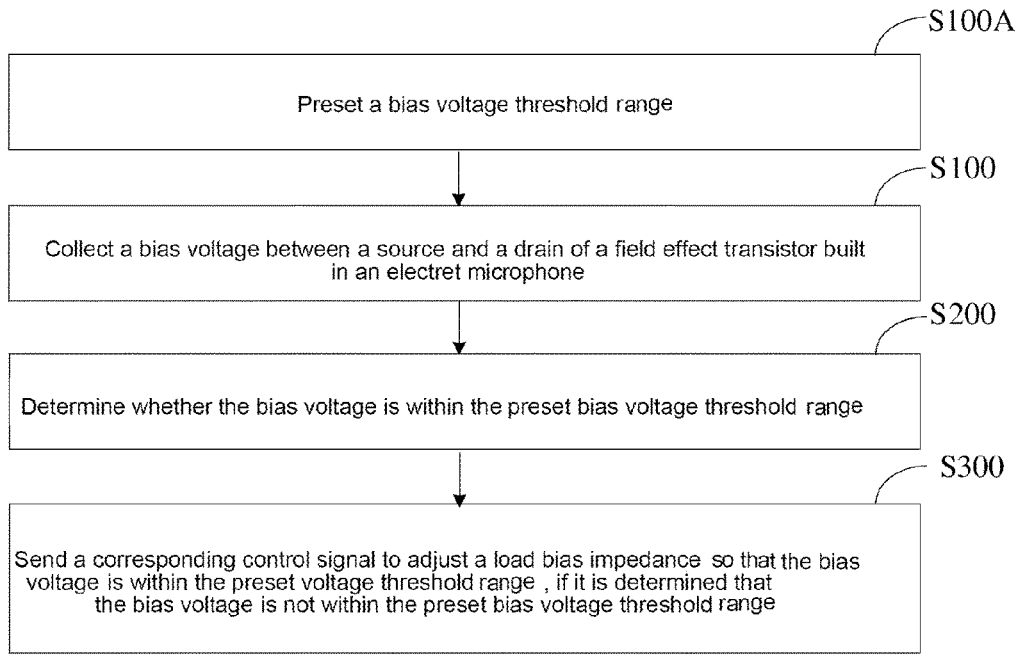
FIG. 3 is a schematic flow diagram showing a second embodiment of an impedance matching method for an electret microphone.

With reference to FIG. 3, FIG. 3 is a schematic flow diagram showing a second embodiment of an impedance matching method for an electret microphone according to the present disclosure. On the basis of the first embodiment, the impedance matching method for the electret microphone provided by the second embodiment further includes the following step prior to step S100:

in step S100A, a bias voltage threshold range is preset.

The impedance matching apparatus for the electret microphone is arranged to preset the bias voltage threshold range, where the bias voltage threshold range may be preset by the user, or the bias voltage threshold range may be adjusted properly by the user according to characteristics of the built-in field transistor in the actual detection. An upper limit of the bias voltage threshold range is preset as a value obtained by adding one half of the supply voltage of the electret microphone with an offset value, and a lower limit of the bias voltage threshold range is preset as a value obtained by subtracting the offset value from one half of the supply voltage of the electret microphone.

According to the impedance matching method for the electret microphone provided in the present embodiment, the preset bias voltage threshold range is set to be about one half of the supply voltage of the electret microphone, so that the dynamic range of the microphone is controlled to reach its maximum and maximum recording and calling effects are achieved.

Figure 4:
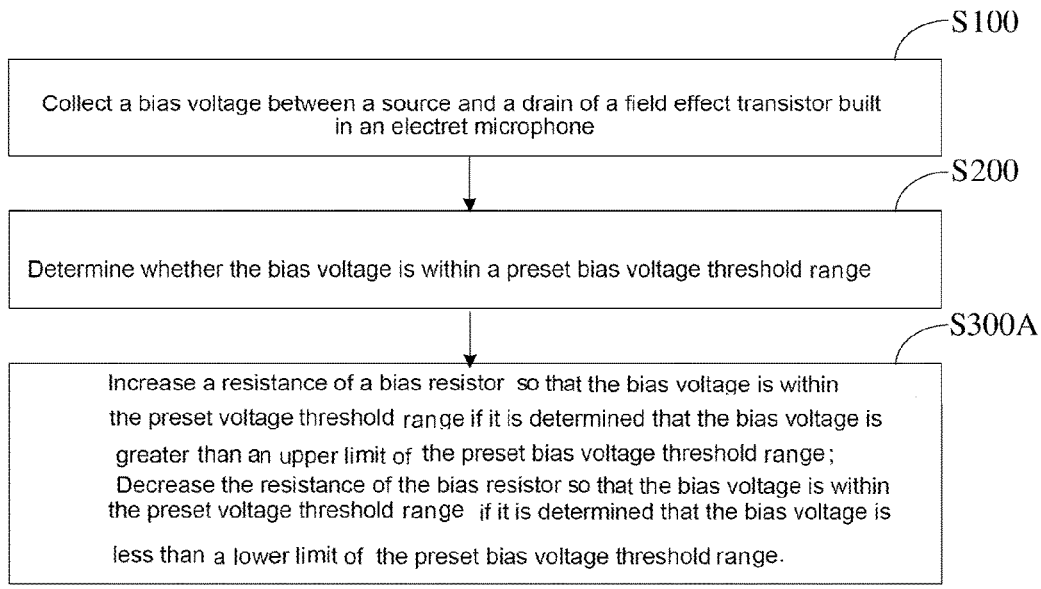
FIG. 4 is a schematic flow diagram showing a third embodiment of an impedance matching method for an electret microphone.

With reference to FIG. 4, which is a schematic flow diagram showing a third embodiment of an impedance matching method for an electret microphone according to the present disclosure, on the basis of the first embodiment, step S300 of the impedance matching method for the electret microphone provided by the third embodiment includes the following step:

in step S300A, if it is determined that the bias voltage is greater than the upper limit of the preset bias voltage threshold range, the resistance of the bias resistor is increased so that the bias voltage is within the preset bias voltage threshold range; and if it is determined that the bias voltage is less than the lower limit of the preset bias voltage threshold range, the resistance of the bias resistor is decreased so that the bias voltage is within the preset bias voltage threshold range.

If the impedance matching apparatus for the electret microphone detects that the bias voltage is greater than the upper limit of the preset bias voltage threshold range, the resistance of the bias resistor is increased; if the impedance matching apparatus for the electret microphone detects that the bias voltage is less than the lower limit of the preset bias voltage threshold range, the resistance of the bias resistor is decreased so that the bias voltage is within the preset bias voltage threshold range. Therefore, the bias voltage is ensured to be within the preset range of the bias voltage threshold range and the quality of the voice signal output by the electret microphone is ensured.

Figure 5:
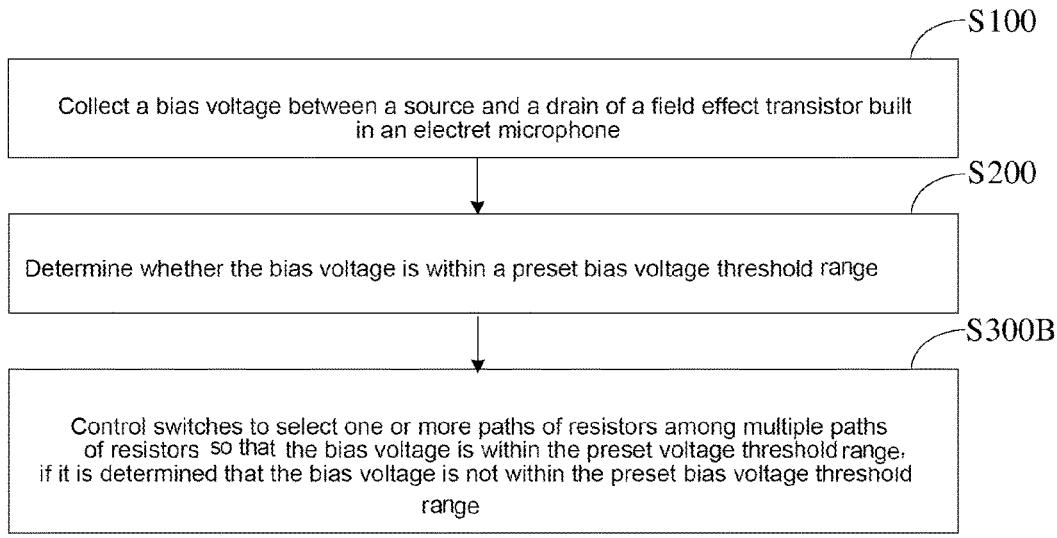
FIG. 5 is a schematic flow diagram showing a fourth embodiment of an impedance matching method for an electret microphone.

With reference to FIG. 5, which is a schematic flow diagram showing a fourth embodiment of an impedance matching method for an electret microphone, on the basis of the first embodiment, step S300 of the impedance matching method for the electret microphone provided by the fourth embodiment includes the following step:

in step S300B, if it is determined that the bias voltage is not within the preset bias voltage threshold range, switches are controlled to select one or more paths of resistors among multiple paths of resistors so that the bias voltage is within the preset bias voltage threshold range.

Figure 6:
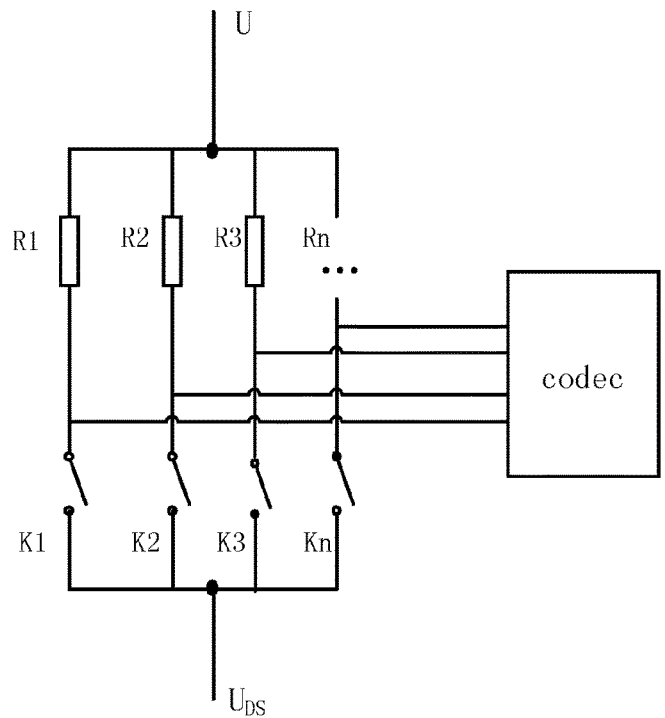
FIG. 6 is a schematic diagram showing a circuit for impedance matching for an electret microphone according to an embodiment.

If the impedance matching apparatus for the electret microphone detects that the bias voltage is not within the preset bias voltage threshold range, switches are controlled to select one or more paths of resistors among the multiple paths of resistors as shown in FIG. 6. FIG. 6 is a schematic diagram showing an impedance matching circuit for an electret microphone according to an embodiment of the present disclosure. The resistor circuit includes multiple paths of resistors, the resistors on each path may be connected in parallel or in series. For example, the resistance of the first path is 50Ω, the resistance of the second path is 100Ω, the resistance of the third path is 200Ω. According to actual needs, if it is detected that the preset bias voltage threshold range is about one half of the supply voltage of the electret microphone, the bias resistance matched with the preset bias voltage threshold range should be 100Ω. In this case, the second path of resistors is selected, and a switch in the second path is controlled to be turned on so that the bias voltage is within the preset bias voltage threshold range.

According to the impedance matching method for the electret microphone provided by the present embodiment, electret microphones in different batches or electret microphones manufactured by different manufacturers are ensured to achieve good operating conditions by matching different electret microphones, thereby improving the overall quality of the voice signal output by the MIC.

Figure 7:
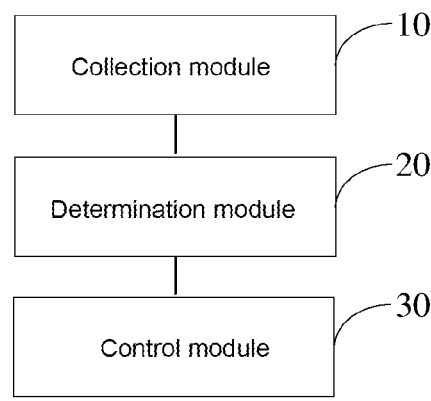
FIG. 7 is a schematic diagram showing functional modules of a first embodiment of an impedance matching apparatus for an electret microphone.

An embodiment provides an impedance matching apparatus for an electret microphone. As shown in FIG. 7, which is a schematic diagram showing functional modules of a first embodiment of an impedance matching apparatus for an electret microphone according to the present disclosure, the impedance matching apparatus for the electret microphone includes:

a collection module 10, arranged to collect a bias voltage output by the electret microphone;

a determination module 20, arranged to determine whether the bias voltage is within a preset bias voltage threshold range; and a control module 30, arranged to send a corresponding control signal to adjust load bias impedance so that the bias voltage is within the preset bias voltage threshold range, if it is determined that the bias voltage is not within the preset bias voltage threshold range.

The electret microphone may include an "acoustic-electric" transition portion and an impedance conversion portion. A key element of the "acoustic-electric" transition portion may be an electret vibrating diaphragm which adopts a very thin plastic film as a substrate. A pure metal film layer is evaporated on a side surface of the substrate, and then the substrate is subjected to an "electret" treatment through a high-voltage electric field, so that opposite charges that may be preserved for a long time are formed on two side surfaces of the substrate. The impedance conversion is realized by means of a field effect transistor built in. The metal polar plate of the electret microphone is connected with a gate G of the field effect transistor, and a source S and a drain D of the field effect transistor are served as extraction electrodes of the electret microphone. Accordingly, together with a metal housing, the electret microphone includes a total of three extraction electrodes, an internal circuit of which is shown in FIG. 1. If the source S (or drain D) of the field effect transistor is connected with the metal housing, only two extraction electrodes are left in the microphone.

An operating principle of the electret MIC is as follows: when the electret diaphragm vibrates due to an acoustic wave, a change in a distance between the electret diaphragm and the metal polar plate may be caused. That is, a capacitance of "capacitor" formed between the electret vibrating diaphragm and the metal polar plate changes with the acoustic wave, causing a change in an inherent electric field across the capacitor (U=Q/C), thereby generating an alternating voltage changing with the change in the acoustic wave. Since the "capacitor" formed between the electret diaphragm and the metal polar plate includes relatively small capacitance (generally, tens of picofarads), the output impedance thereof is high (XC=1/2πfC), which is about tens of megohms or more. Such a high impedance fails to directly match an input end of a general audio amplifier, so that a junction field effect transistor is provided in the MIC for performing impedance conversion. The voltage across the "capacitor" is extracted by the field effect transistor with a very high input impedance, and is amplified, so that an output voltage signal corresponding to the acoustic wave is obtained.

The collection module 10 of the impedance matching apparatus for the electret microphone is arranged to firstly collect the bias voltage $U_{Ds}$ between the source and the drain of the field transistor built in the electret microphone.

The determination module 20 of the impedance matching apparatus for the electret microphone is arranged to determine whether the collected bias voltage $U_{Ds}$ is within the preset bias voltage threshold range, where the bias voltage threshold range may be preset by the user, or a range of the bias voltage threshold range may be adjusted properly by the user according to characteristics of the built-in field transistor in the actual detection. An upper limit of the bias voltage threshold range is preset as a value obtained by adding one half of the supply voltage of the electret microphone with an offset value, and a lower limit of the bias voltage threshold range is preset as a value obtained by subtracting the offset value from one half of the supply voltage of the electret microphone.

If it is detected that the bias voltage is not within the preset bias voltage threshold range, the control module 30 of the impedance matching apparatus for the electret microphone sends a corresponding control signal to adjust the load bias impedance, so that the bias voltage is within the preset bias voltage threshold range. For example, if it is detected that the bias voltage is greater than the upper limit of the preset bias voltage threshold range, the load bias impedance is increased; if it is detected that the bias voltage is less than the lower limit of the preset bias voltage threshold range, the load bias impedance is decreased; if it is detected that the bias voltage is within the preset bias voltage threshold range, the load bias impedance is kept constant.

The impedance matching apparatus for the electret microphone provided by the present embodiment improves the quality of the voice signal output by the MIC, and improves the recording quality and the call quality of a communication device.

Figure 8:
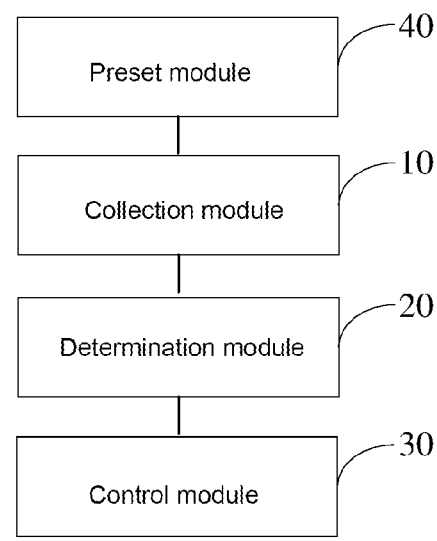
FIG. 8 is a schematic diagram showing functional modules of a second embodiment of an impedance matching apparatus for an electret microphone.

With reference to FIG. 8, which is a schematic diagram showing functional blocks of a second embodiment of an impedance matching apparatus for an electret microphone, on the basis of the first embodiment, the impedance matching apparatus for the electret microphone provided by the second embodiment further includes a preset module 40, arranged to preset the bias voltage threshold range.

The preset module 40 of the impedance matching apparatus for the electret microphone is arranged to preset the bias voltage threshold range. The bias voltage threshold range may be preset by the user, or a range of the bias voltage threshold range may be adjusted properly by the user according to characteristics of the built-in field transistor in the actual detection. An upper limit of the bias voltage threshold range is preset as a value obtained by adding one half of the supply voltage of the electret microphone with an offset value, and a lower limit of the bias voltage threshold range is preset as a value obtained by subtracting the offset value from one half of the supply voltage of the electret microphone.

According to the impedance matching apparatus for the electret microphone provided in the present embodiment, the preset bias voltage threshold range is set to be about one half of the supply voltage of the electret microphone, thus the dynamic range of the microphone is controlled to reach its maximum, and optimal recording and call effects are achieved.

Further, with reference to FIG. 7, in the impedance matching apparatus for the electret microphone provided by the first embodiment, the control module 30 is further arranged to increase the resistance of the bias resistor so that the bias voltage is within the preset bias voltage threshold range, if it is detected that the bias voltage is greater than the upper limit of the preset bias voltage threshold range; and is arranged to decrease the resistance of the bias resistor so that the bias voltage is within the preset bias voltage threshold range, if it is detected that the bias voltage is less than the lower limit of the preset bias voltage threshold range.

The control module 30 of the impedance matching apparatus for the electret microphone is arranged to increase the resistance of the bias resistor if it is detected that the bias voltage is greater than the upper limit of the preset bias voltage threshold range, and decrease the resistance of the bias resistor if it is detected that the bias voltage is less than the lower limit of the preset bias voltage threshold range, so that the bias voltage is within the preset bias voltage threshold range. Therefore, the bias voltage is ensured to be within the preset range of the bias voltage threshold range and the quality of a voice signal output by the electret microphone is ensured.

The control module 30 is further arranged to control switches to select one or more paths of resistors among multiple paths of resistors so that the bias voltage is within the preset bias voltage threshold range, if it is detected that the bias voltage is not within the preset bias voltage threshold range.

The above modules may be implemented by a processor and associated memory for storing executable instructions for use in performing the functions, operations, and/or algorithms described.

If it is detected that the bias voltage is not within the preset bias voltage threshold range, the control module 30 of the impedance matching apparatus for the electret microphone controls switches to select one or more paths of resistors among the multiple paths of resistors. As shown in FIG. 6, which is a schematic diagram showing an impedance matching circuit for an electret microphone according to an embodiment of the present disclosure, the resistor circuit includes multiple paths of resistors, the resistors on each path may be connected in parallel or in series. For example, the resistance of the first path is 50Ω, the resistance of the second path is 100Ω, the resistance of the third path is 200Ω. According to actual needs, if it is detected that the preset bias voltage threshold range is about one half of the supply voltage of the electret microphone, the bias resistance matched with the preset bias voltage threshold range should be 100Ω. In this case, the second path of resistors is selected, and a switch in the second path is controlled to be turned on so that the bias voltage is within the preset bias voltage threshold range.

According to the impedance matching apparatus for the electret microphone provided by the present embodiment, electret microphones in different batches or electret microphones manufactured by different manufacturers are ensured to achieve good operating conditions by matching different electret microphones, thereby improving the overall quality of the voice signal output by the MIC.

An embodiment provides a communication device including the above impedance matching apparatus for the electret microphone, which improves the recording quality and the call quality, and will not be described herein.

An embodiment provides a computer program including program instructions which, when being executed by a computer, cause the computer to carry out any one of the above impedance matching methods for the electret microphone.

An embodiment provides a non-transitory computer-readable storage medium, storing the computer program.

According to the impedance matching method for an electret microphone, the impedance matching apparatus for the electret microphone and the communication device provided by the technical solutions of the present disclosure, the quality of a voice signal output by the MIC is improved, and the recording quality and the call quality of a communication device are improved.

Upon reading and understanding of the accompanying drawings and the detailed description, other aspects will be apparent.

The foregoing are merely embodiments of the present disclosure and are not intended to limit the patent scope of the claims. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. Various components disclosed and/or illustrated in the figures may be implemented as hardware and/or software and/or firmware on a processor, ASIC/FPGA, dedicated hardware, and/or logic circuitry. All of the features disclosed in this specification (including any accompanying claims, abstract and drawings), and/or all of the steps of any method or process so disclosed, may be combined in any combination to form additional embodiments (except combinations where at least some of such features and/or steps are mutually exclusive), all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An impedance matching method for an electret microphone, comprising:
    measuring a bias voltage between a source and a drain of a field effect transistor disposed in the electret microphone;
    determining whether the bias voltage is within a preset bias voltage threshold range; and adjusting load bias impedance such that the bias voltage is within the preset bias voltage threshold range, in response to determining that the bias voltage is not within the preset bias voltage threshold range,
    wherein the load bias impedance comprises a resistance of a bias resistor connected between the drain of the field effect transistor and a supply voltage of the electret microphone; and
    wherein adjusting the load bias impedance such that the bias voltage is within the preset bias voltage threshold range, in response to determining that the bias voltage is not within the preset bias voltage threshold range, comprises:
        increasing the resistance of the bias resistor such that the bias voltage is within the preset bias voltage threshold range, in response to determining that the bias voltage is greater than an upper limit of the preset bias voltage threshold range; and
        decreasing the resistance of the bias resistor such that the bias voltage is within the preset bias voltage threshold range, in response to determining that the bias voltage is less than a lower limit of the preset bias voltage threshold range.

2. The impedance matching method for an electret microphone according to claim 1, further comprising, prior to measuring a bias voltage between a source and a drain of a field effect transistor disposed in the electret microphone:
    presetting the bias voltage threshold range.

3. The impedance matching method for an electret microphone according to claim 2, wherein an upper limit of the bias voltage threshold range is a preset value determined based on adding one half of the supply voltage of the electret microphone with an offset value, and a lower limit of the bias voltage threshold range is a preset value determined based on subtracting the offset value from one half of the supply voltage of the electret microphone.

4. The impedance matching method for an electret microphone according to claim 1, wherein adjusting the load bias impedance such that the bias voltage is within the preset bias voltage threshold range, in response to determining that the bias voltage is not within the preset bias voltage threshold range, further comprises:
    controlling switches to select one or more paths of resistors among multiple paths of resistors such that the bias voltage is within the preset bias voltage threshold range, in response to determining that the bias voltage is not within the preset bias voltage threshold range.

5. The impedance matching method for an electret microphone according to claim 2, wherein adjusting the load bias impedance such that the bias voltage is within the preset bias voltage threshold range, in response to determining that the bias voltage is not within the preset bias voltage threshold range, further comprises:
    controlling switches to select one or more paths of resistors among multiple paths of resistors such that the bias voltage is within the preset bias voltage threshold range, in response to determining that the bias voltage is not within the preset bias voltage threshold range.

6. The impedance matching method for an electret microphone according to claim 3, wherein adjusting the load bias impedance such that the bias voltage is within the preset bias voltage threshold range, in response to determining that the bias voltage is not within the preset bias voltage threshold range, further comprises:
    controlling switches to select one or more paths of resistors among multiple paths of resistors such that the bias voltage is within the preset bias voltage threshold range, in response to determining that the bias voltage is not within the preset bias voltage threshold range.

7. An impedance matching apparatus for an electret microphone, comprising a processor configured to:
    measure a bias voltage output by the electret microphone;
    determine whether the bias voltage is within a preset bias voltage threshold range; and adjust load bias impedance such that the bias voltage is within the preset bias voltage threshold range, in response to determining that the bias voltage is not within the preset bias voltage threshold range,
    wherein the load bias impedance comprises a resistance of a bias resistor connected between a drain of a field effect transistor disposed in the electret microphone and a supply voltage of the electret microphone;
    wherein the processor further configured to:
        increase the resistance of the bias resistor such that the bias voltage is within the preset bias voltage threshold range, in response to determining that the bias voltage is greater than an upper limit of the preset bias voltage threshold range; and
        decrease the resistance of the bias resistor such that the bias voltage is within the preset bias voltage threshold range, in response to determining that the bias voltage is less than a lower limit of the preset bias voltage threshold range.

8. The impedance matching apparatus for an electret microphone according to claim 7, wherein the processor is further configured to preset the bias voltage threshold range.

9. The impedance matching apparatus for an electret microphone according to claim 8, wherein an upper limit of the bias voltage threshold range is a preset value determined based on adding one half of the supply voltage of the electret microphone with an offset value, and a lower limit of the bias voltage threshold range is a preset value determined based on subtracting the offset value from one half of the supply voltage of the electret microphone.

10. The impedance matching apparatus for an electret microphone according to claim 7, wherein the processor is configured to adjust the load bias impedance such that the bias voltage is within the preset bias voltage threshold range, the processor further configured to:
control switches to select one or more paths of resistors among multiple paths of resistors such that the bias voltage is within the preset bias voltage threshold range in response to determining that the bias voltage is not within the preset bias voltage threshold range.

11. A communication device, comprising the impedance matching apparatus for the electret microphone according to claim 7.

12. A non-transitory computer storage medium storing a plurality of computer-executable instructions that, when executed by an apparatus for impedance matching for an electret microphone, causes the apparatus to perform the method of:
measuring a bias voltage between a source and a drain of a field effect transistor disposed in the electret microphone;
determining whether the bias voltage is within a preset bias voltage threshold range; and adjusting load bias impedance such that the bias voltage is within the preset bias voltage threshold range, in response to determining that the bias voltage is not within the preset bias voltage threshold range,
wherein the load bias impedance comprises a resistance of a bias resistor connected between the drain of the field effect transistor and a supply voltage of the electret microphone; and
wherein adjusting the load bias impedance such that the bias voltage is within the preset bias voltage threshold range, in response to determining that the bias voltage is not within the preset bias voltage threshold range, comprises:
increasing the resistance of the bias resistor such that the bias voltage is within the preset bias voltage threshold range, in response to determining that the bias voltage is greater than an upper limit of the preset bias voltage threshold range; and
decreasing the resistance of the bias resistor such that the bias voltage is within the preset bias voltage threshold range, in response to determining that the bias voltage is less than a lower limit of the preset bias voltage threshold range.

13. The non-transitory computer storage medium according to claim 12, wherein the method further comprises, prior to measuring the bias voltage between the source and the drain of the field effect transistor disposed in the electret microphone:
presetting the bias voltage threshold range.

14. The non-transitory computer storage medium according to claim 13, wherein an upper limit of the bias voltage threshold range is a preset value determined based on adding one half of the supply voltage of the electret microphone with an offset value, and a lower limit of the bias voltage threshold range is a preset value determined based on subtracting the offset value from one half of the supply voltage of the electret microphone.

15. The non-transitory computer storage medium according to claim 12, wherein adjusting the load bias impedance such that the bias voltage is within the preset bias voltage threshold range, in response to determining that the bias voltage is not within the preset bias voltage threshold range, further comprises:
controlling switches to select one or more paths of resistors among multiple paths of 5 resistors such that the bias voltage is within the preset bias voltage threshold range, in response to determining that the bias voltage is not within the preset bias voltage threshold range.

* * * * *